364-516 SR
11/24/87 XR 4,709,330

United States Patent [19]

Yokoi et al.

[11] Patent Number: 4,709,330

[45] Date of Patent: Nov. 24, 1987

[54] SYSTEM FOR SUPERVISING AND GUIDING PERSONS IN CONSTRUCTION

[75] Inventors: Shigeo Yokoi, Kitasoma; Takashi Isozaki, Komaki; Ryuta Yamamoto, Yokohama; Toshiyuki Kawaguchi, Inuyama, all of Japan

[73] Assignee: NGK Insulators Ltd., Nagoya, Japan

[21] Appl. No.: 657,532

[22] Filed: Oct. 4, 1984

[30] Foreign Application Priority Data

Oct. 7, 1983 [JP] Japan ............................... 58-188932

[51] Int. Cl.[4] ........................ G06F 15/20; G06G 7/48

[52] U.S. Cl. .................................... 364/400; 364/516; 340/573

[58] Field of Search ................ 364/400, 516; 340/573, 340/539, 572

[56] References Cited

U.S. PATENT DOCUMENTS

| | | | |
|---|---|---|---|
| 3,098,220 | 7/1963 | De Graaf | 340/825.48 |
| 3,122,847 | 3/1964 | Redfield et al. | 455/89 |
| 3,478,344 | 11/1969 | Schwitzgebel et al. | 340/825.44 |
| 4,025,194 | 5/1977 | Teppo | 365/5 |
| 4,110,741 | 8/1978 | Hubert et al. | 340/573 |
| 4,227,577 | 10/1980 | Iida | 340/573 |
| 4,468,656 | 8/1984 | Clifford et al. | 340/539 |

FOREIGN PATENT DOCUMENTS

| | | | |
|---|---|---|---|
| 936921 | 11/1973 | Canada | 455/89 |
| 2431937 | 1/1976 | Fed. Rep. of Germany | 455/607 |
| 333562 | 12/1958 | Switzerland | 455/607 |
| 2103043 | 2/1983 | United Kingdom | 455/607 |

*Primary Examiner*—E. A. Goldberg
*Assistant Examiner*—Lincoln Donovan
*Attorney, Agent, or Firm*—Parkhurst & Oliff

[57] ABSTRACT

A system for supervising and guiding workers at various places in a construction such as an underground substation, underground market, building, or tunnel is disclosed which includes a number of receivers arranged in a number of sections of the construction for receiving infrared radiation emitted from workers to produce a detection signal, a detection device arranged in a central control room for processing the detection signals supplied from the receivers to detect positions of workers in the construction, and communication devices provided in each section and the central control room for providing the workers with various kinds of instructions, commands and messages for preventing a disaster and escaping an emergency.

20 Claims, 5 Drawing Figures

SYSTEM FOR SUPERVISING AND GUIDING PERSONS IN CONSTRUCTION

BACKGROUND OF THE INVENTION

The present invention relates to a system for supervising and guiding persons in constructions such as buildings, underground markets, underground substations and tunnels, and more particularly to a system for supervising workers in a construction who are engaged in various work such as inspection, maintenance and repair, and informing them of guided instructions adequate for emegency escape upon a disaster such as fire, flood and earthquake.

Heretofore, in order to give persons in a construction information for emergency escape upon a disaster such as fire, there are provided guide lamps for indicating emergency exists and ladders and loudspeakers for announcing the guide information. However, such a system is not sufficient for guiding effectively and positively the persons into safe places. This is mainly due to the fact that operators of a central control room responsible for providing the guide information are unaware of the location of the various persons. In order to mitigate the above drawbacks, in Japanese Patent Application Laid-open Publication No. 98,199/76 there has been proposed a system for providing the guide information in accordance with a distribution of persons in a building, which distribution can be obtained by processing electric signals supplied from a number of contact switches arranged over the floor of the building in a matrix form. However, in such a system, a number of switches have to be arranged over the floor, and thus it is practically difficult to apply such a system to existing buildings. Moreover, the switches are subjected to wear and cannot be used for a long time. Moreover, there has been proposed a security system comprising sensors for detecting the passage of persons through entrances and exits. However, in such a system it is entirely impossible to recognize the locations of the persons.

In the constructions such as underground substations and tunnels in which there are a relatively small number of workers, there is usually provided a system for guiding the workers into safe places by means of a wireless communication system such as a combination of antenna cable and transceivers or portable communication devices, and a wire communication system such as a local telephone system. In such a system, a central control room can know positions of workers in the construction only by receiving messages from the workers. Therefore, if a worker is in a situation where he cannot send a message, the central control room cannot recognize him.

SUMMARY OF THE INVENTION

The present invention has for its object provision of a novel and useful supervising and guiding system which can mitigate the above mentioned drawbacks of the known systems and can send guide information adequate for emergency escape by individual persons in disasters.

It is another object of the invention to provide a supervising and guiding system which can inform persons of various kinds of information such as commands for protection and rescue and instructions for emergency escape upon disasters, while positions of persons in a construction can be recognized precisely without such persons sending any messages.

According to the invention, a system for supervising and guiding persons in a construction divided into a plurality of sections comprises:

a plurality of receiving means each provided in respective sections for receiving radiation emitted from one or more persons in a section to produce a signal representing the existence of persons in the relevant section, for supplying the signal to a central control room together with a signal identifying the relevant section;

means arranged in the central control room for receiving the signal supplied from the receiving means provided in the relevant section in which one or more persons are situated;

means provided in the central control room for displaying the detected position of the section in the construction; and means provided in the central control room for sending information to the section.

DESCRIPTION OF THE PREFERRED EMBODIMENTS

Figure 1:
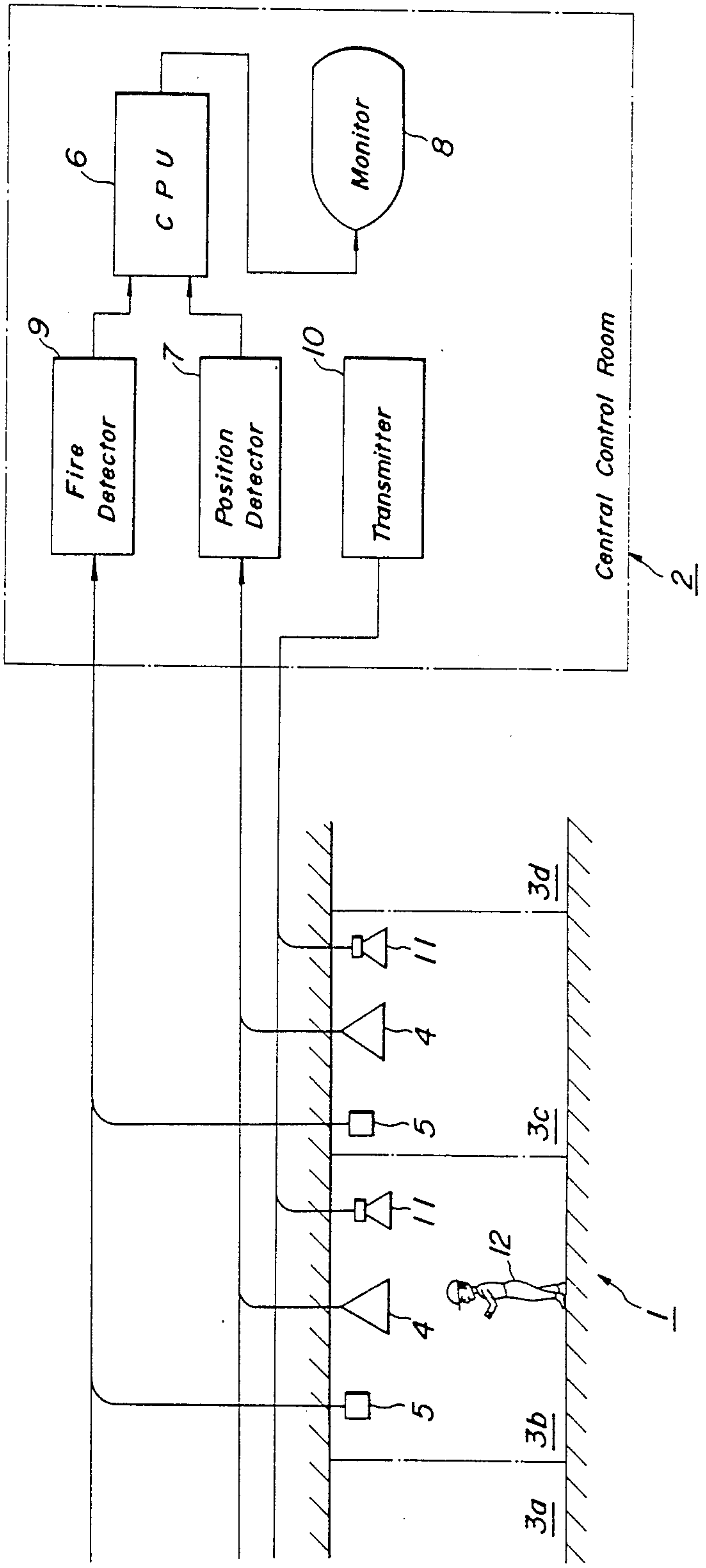
FIG. 1 is a schematic view showing an embodiment of the system according to the invention using infrared radiation emitted from human beings.

FIG. 1 is a schematic view showing an embodiment of the supervising and guiding system according to the invention. According to the invention, a construction 1 such as an underground substation is divided into a number of sections 3*a*, 3*b*, 3*c* . . . It should be noted that the sections are not always separated by partitions such as walls, but may be continuous. The system comprises a central control room 2 which may or may not be provided in the construction 1. In each section, there is provided a receiver 4 having an infrared receiving element for detecting infrared radiation having a wavelength of about 5 to 20 $\mu$m emitted from a human body, i.e. worker 12. The receiver 4 may be provided on a ceiling or wall. In order to detect positively infrared radiation emitted from persons situating anywhere in the construction 1, the receivers 4 are provided not only in rooms but also in passages, stairs etc. The number of receivers 4 to be provided in the construction 1 is determined in accordance with various conditions such as incident angles of receivers, obstacles, height or level at which the receivers are arranged, and so on. The larger the number of receivers, the higher the accuracy of position detection. In such section there is further provided a fire detection sensor 5 which may be a heat sensor of a differential, compensating or constant temperature type, a smoke sensor of an ionic or photoelectric type, or an oxygen sensor of ceramic type for detecting an oxygen concentration. In the central control room 2 there are provided a position detection device 7 for detecting positions of workers 12 by processing signals supplied from the receivers 4 under the control of a central processing unit 6, a display device 8 for displaying detected positions of the workers in the construction 1, a fire detection device 9 for detecting a fire and its position by processing signals supplied from the fire detection sensors 5 provided in respective sections 3*a*, 3*b*, 3*c* . . . in the construction 1, and a transmitter 10 for transmitting command and guide messages for preventing the fire and guiding the workers into safe places. The messages are supplied to loudspeakers 11 provided in respective sections in the construction 1. It should be noted that the loudspeakers 11 may be replaced by wireless transmitter-receivers which are possessed by respective workers 12.

When a fire takes place at a section in the construction 1 and is detected by a fire sensor 5 provided in the relevant section, a fire detection signal is supplied to the fire detection device 9 in the control room 2 and then the fire detection device 9 and central processing unit 6 analyze the signal to detect the section at which the fire has been detected and the condition of the fire. Then, the detected position and condition of fire are displayed on the display device 8 in the central control room 2. At the same time, the receivers 4 in all the sections 3*a*, 3*b* . . . always receive infrared radiations emitted from workers 12 and electric signals representing existences of workers in respective sections are supplied to the position detection device 7 in the central control room 2. Thus the position detection device 7 and central processing unit 6 recognize positions of workers 12 in the construction 1. Then the central processing unit 6 operates in accordance with a suitable program to find the best escape routes on the basis of the position and condition of the fire and the positions of workers. The detected escape routes are displayed on the display device 8 in the control room 2. An operator in the central control room 2 can then transmit to the workers various instructions and information for the prevention of fire and for emergency escape. For instance, if one or more workers are in one or more sections near the section in which the fire has been detected, the control room 2 can send them a command for the prevention of fire. Further, when it is recognized that a worker has not acted so as to escape but is considered to have lost sense, the central control room 2 can send a rescue command to one or more workers who are situated near the section inhabited by such worker. According to the invention, even if a worker loses his way due to thick smoke, he can receive instructions regarding the best escape, because the central control room 2 can always grasp his position in the construction without receiving any message from him. In this manner, the workers can be effectively and positively protected from the disaster and particularly from death.

In this embodiment, respective sections, i.e. the positions of workers and the sections at which the fire takes place, should be detected or identified by the central control room 2. This can be realized by any one of various known methods. For instance, respective receivers 4 and fire sensors 5 may be connected to the position detection device 7 and fire detection device 9 by means of separate electrical conductors or optical fibers. It is preferable to utilize the frequency or time multiplex method. In such a case, various signals can be sent via a single common transmission line, thereby rendering, the system simple. For instance, in the case of using the frequency multiplex method, a signal detected by the infrared radiation sensor 4 of a section may be modulated on a carrier having a frequency specific to the relevant section. The modulation may be either frequency modulation or amplitude modulation. In the central control room 2 the relevant section can be identified by discriminating the carrier frequency and by demodulating the modulating signal. In the case of using the time multiplex method, specific codes are denoted to each section and the signals from the sensors 4 and 5 may be sent to the central control room 2 together with the specific codes.

Figure 2:
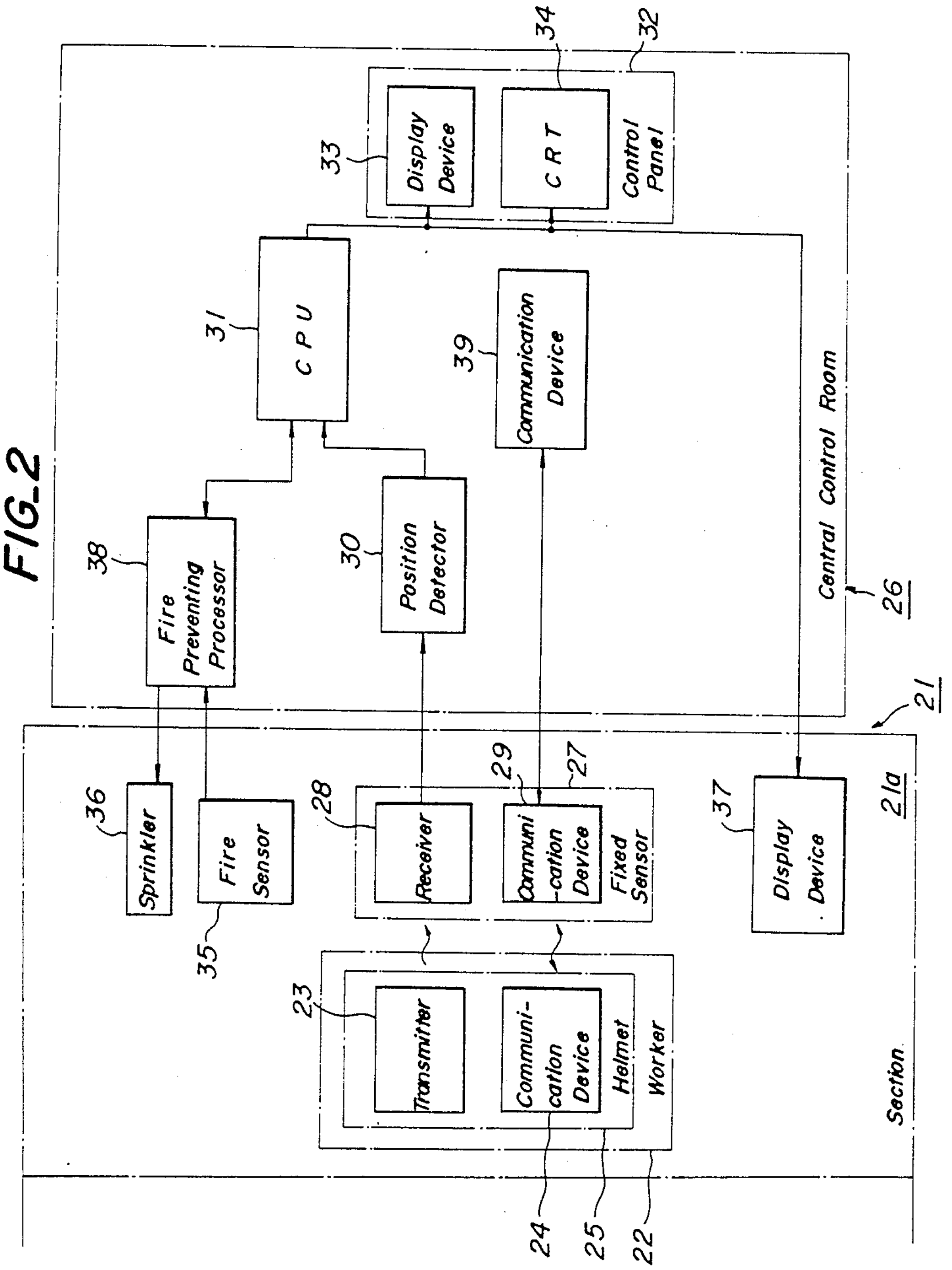
FIG. 2 is a block diagram illustrating another embodiment of the system according to the invention using electromagnetic radiation emitted from a transmitter.
Figure 3:
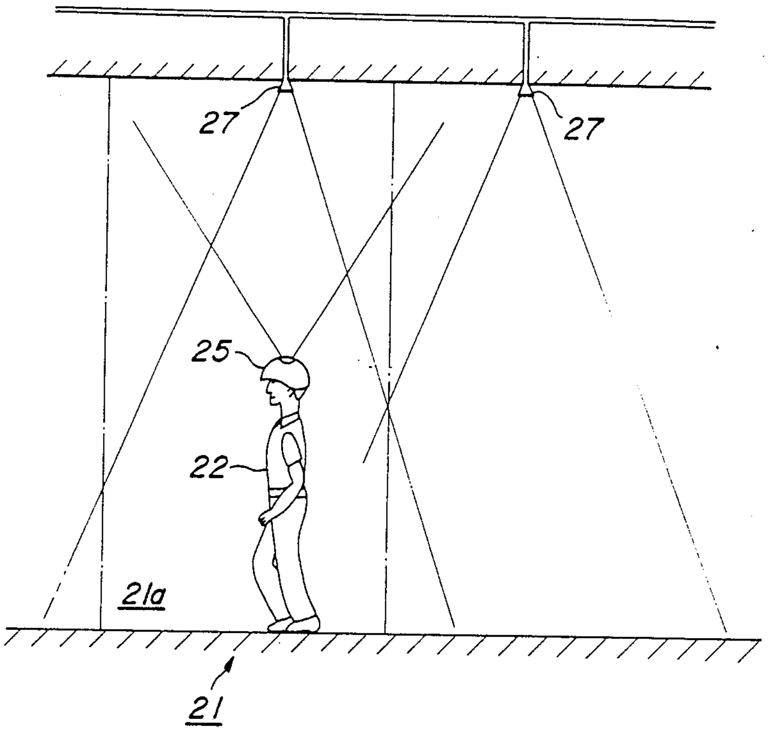
FIG. 3 is a schematic view depicting the construction of a section of the system shown in FIG. 2.

FIG. 2 is a block diagram showing another embodiment of the system according to the invention. In this embodiment, a construction 21 is similarly divided into a number of sections. In the drawing, a construction of only one section 21*a* is shown. Every worker 22 working in the construction 21 possesses a transmitter 23 for transmitting an electromagnetic wave modulated by a worker identifying signal having a frequency specific to a particular worker, and a communication device 24 for effecting an intercommunication between workers and a central control room 26, and between respective workers, by means of an electromagnetic wave. The transmitter 23 and communication device 24 are installed in a device possessed or worn by the worker such as a helmet 25, so that the worker 22 can easily carry them. As illustrated in FIG. 3 the electromagnetic wave is projected upward from the top of helmet 25. On a ceiling of the construction 21 there are arranged fixed sensors 27 comprising a receiver 28 for receiving the electromagnetic wave emitted from the transmitter 23 and a communication device 29 for receiving an electromagnetic wave emitted from the communication device 24 and transmitting an electromagnetic wave toward the device 24. As shown in FIG. 3, a fixed sensor 27 is provided in respective sections of the construction. In the central control room 26, there are provided a position detection device 30 for detecting or identifying particular sections by processing signals from the receivers 28 of fixed sensors 27. To this end, a receiver 28 in a section transmits a signal received from the transmitter 23 provided in the helmet 25 to the central control room 26 together with a section identifying signal specific to the relevant section. The position detection device 30 in the central control room 26 can recognize each worker by section location. The detected position of each worker is displayed on a cathode ray tube 34 of a control panel 32 under the control of a central processing unit 31. It should be noted that if respective fixed sensors 27 are scanned successively by the position detection device 30, it is not necessary that the receivers 28 transmit the signal together with the section identifying signals, and therefore the whole system may be simple.

In this manner, by detecting the electromagnetic waves emitted from the helmets 25 carried by the workers 22 by means of the fixed sensors 27, it is possible to identify the positions of the workers 22 in the construction 21.

In this embodiment, it is preferable that the electromagnetic wave has a directional property and is hardly decayed by smoke and flame. To this end, the electromagnetic wave has preferably a frequency range from 100 MHz to 10 GHz. By using such a frequency range, it is possible to detect the position of the worker precisely, even if some obstacles are existent above the workers. In the case of using the electromagnetic wave having a frequency lower than 100 MHz, the directional property is decreased, and when the frequency is made higher than 10 GHz, many reflected electromagnetic waves are received. In both cases, the positions of the workers cannot be detected accurately. Further, according to the invention use may be made of infrared radiation having a wavelength longer than 800 nm.

Figure 4:
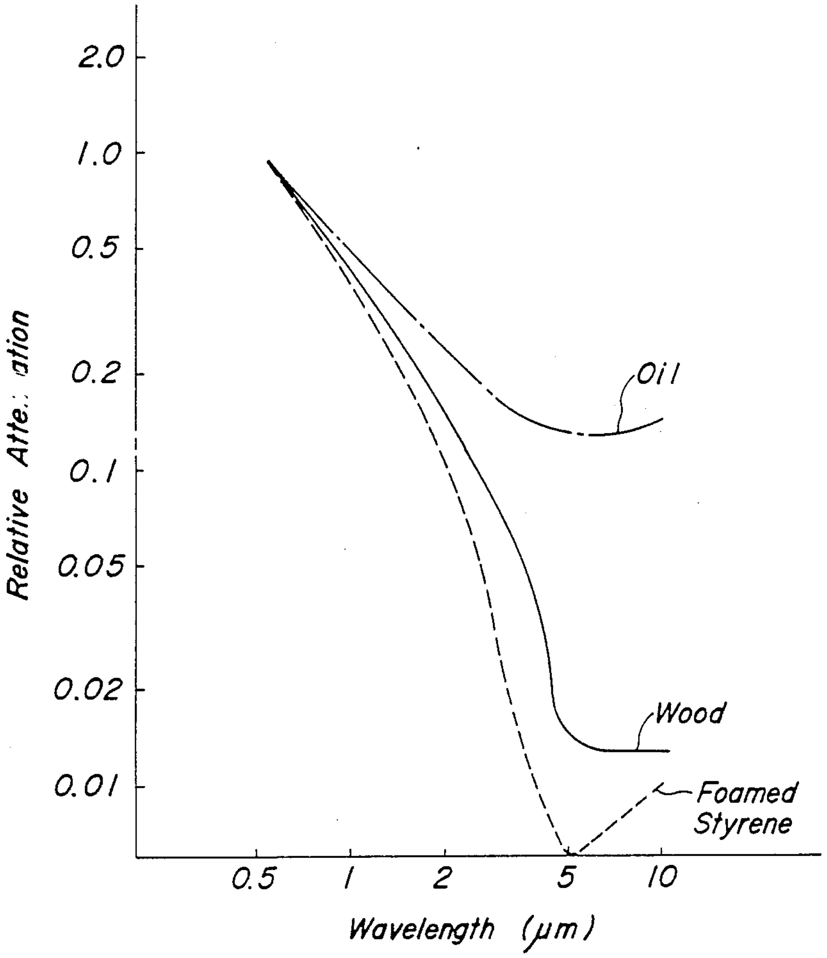
FIG. 4 is a graph showing attenuation of infrared radiation in smokes of various materials.

FIG. 4 shows a graph of light attenuation characteristics of the infrared radiation in smokes of various substances such as oil, wood and foamed styrene. As can be understood from FIG. 4, infrared radiation having a wavelength longer than 5 μm is hardly attenuated by smokes produced by oil, wood and foamed styrene and therefore is preferably used in the system according to the invention.

In the embodiment shown in FIG. 2, if the electromagnetic wave transmitted from the transmitter 23 has a frequency equal to that of the electromagnetic wave propagating between the communication devices 24 and 29, the circuit construction can be made simple. Further, in the case of using infrared radiation, it is possible to distinguish clearly the infrared radiations emitted from the transmitter 23 and communication devices 24 and 29 from that emitted from the fire, because the wavelengths are distinctly different from each other. Moreover, in the case of using infrared radiation, the fixed sensor 27 can detect any abnormal increase in temperature which usually occurs before the fire, as well as the existence of flames.

As shown in FIG. 2, in respective sections of the construction 21 there are arranged fire sensors 35 for detecting the fire with the aid of heat or smoke, fire sprinkling systems 36 for preventing the fire by sprinkling water, and display devices 37 for displaying escape passages in the construction 21. In the central control room 26, there are provided a fire preventing processor 38 for receiving a signal supplied from the fire sensor 35 and actuating the sprinkler 36. When the fire sensor 35 produces a signal representing the occurrence of fire, or the fixed sensor 27 detects any abnormal increase in temperature, the central processing unit 31 detects the position of a section experiencing fire and the detected position is displayed on the cathode ray tube 34 on the control panel 32. At the same time, the central processing unit 31 can recognize the positions of respective workers 22, and the emergency escape passages are automatically calculated for respective workers and are displayed on the cathode ray tube 34 as well as on the display devices 37 in respective sections. The central control room 26 further comprises a communication device 39 for effecting intercommunication between the central control room 26 and respective workers 22 in the construction. Therefore, the operator in the central control room 26 can send to particular workers the adequate emergency instructions on the basis of the displayed images on the cathode ray tube 34 and the fire display device 33 in the control panel 32.

As explained above in detail, in this embodiment since the electromagnetic wave modulated with the helmet identifying signal having the specific frequency is always transmitted from the transmitter 23, and the fixed sensor 27 sends to the central control room 26 the received helmet identifying signal together with the code signal denoting the relevant section, the central control room 26 can always grasp the information concerning not only identification of respective workers 22, but also their positions in the construction 21, without receiving any message from the workers. Therefore, the central control room 26 can send to respective workers very accurate and useful information about emergency escape and instruction for the prevention of fire, and respective workers can act adequately in accordance with the message from the central control room 26.

Figure 5:
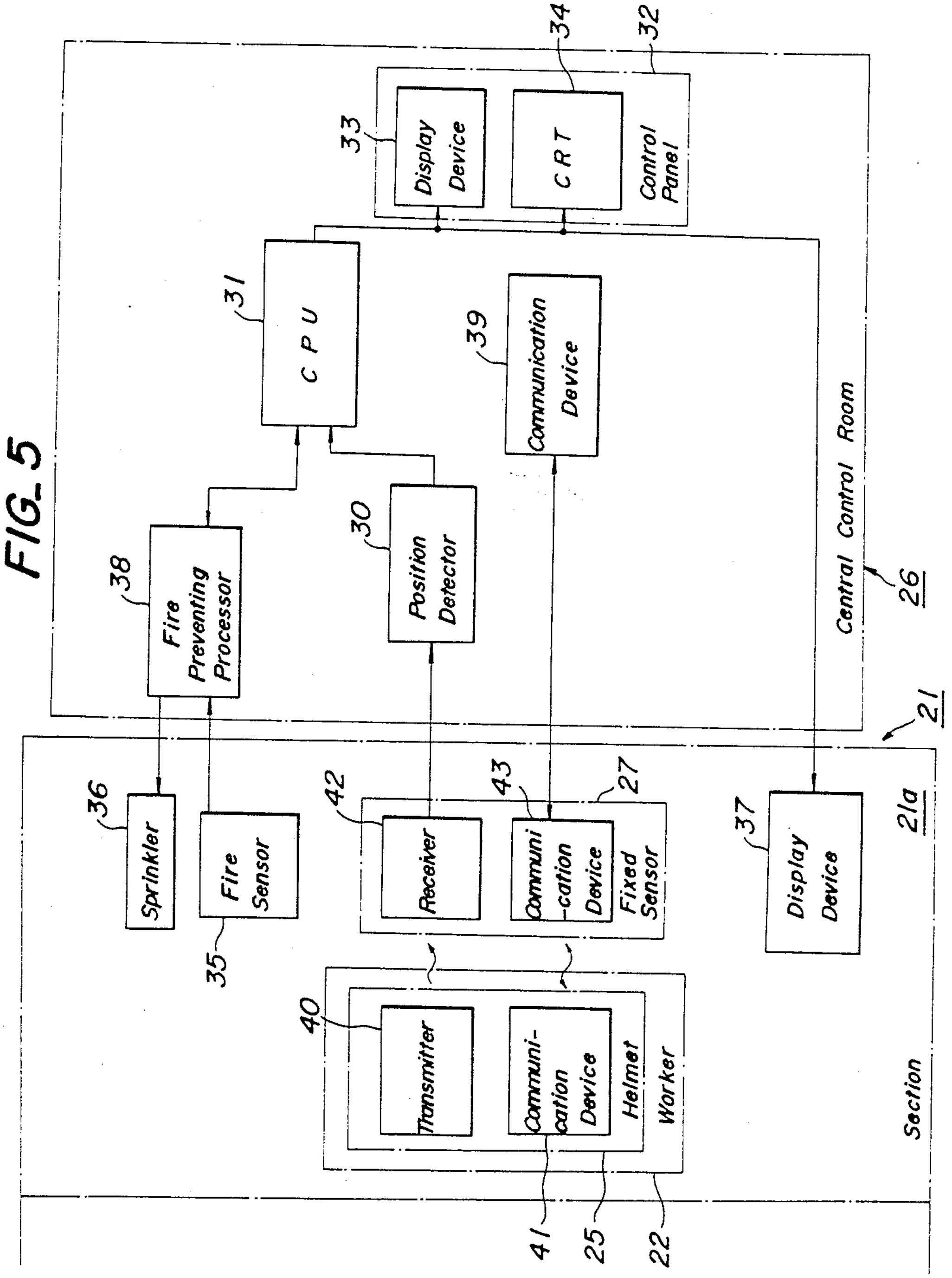
FIG. 5 is a block diagram illustrating still another embodiment of the system according to the invention using ultrasonic radiation emitted from a transmitter.

FIG. 5 is a block diagram showing still another embodiment of the system according to the invention. In this embodiment, portions similar to those shown in FIG. 2 are denoted by the same reference numerals used in FIG. 2. Every worker 22 working in a construction 21 divided into sections 21*a* . . . possesses a transmitter 40 for transmitting an ultrasonic wave modulated with a worker identifying signal having a frequency specific to particular workers, and a communication device 41 for effecting an intercommunication between workers and a central control room 26, and between respective workers, by means of an ultrasonic wave. The transmitter 40 and communication device 41 are installed in a helmet 25, so that the worker 22 can easily carry them. Then the ultrasonic wave is projected upward from the top of helmet 25. On a ceiling of the construction 21 there are arranged fixed sensors 27 comprising an ultrasonic receiver 42 for receiving the ultrasonic wave emitted from the transmitter 40 and a communication device 43 for receiving the ultrasonic wave emitted from the communication device 41 and transmitting the ultrasonic wave toward the communication device 41. Similar to the previous embodiments, fixed sensors 27 are provided in respective sections of construction. In the central control room 26, there are provided a position detection device 30 for detecting or identifying particular sections by processing signals from the receivers 42 of fixed sensors 27. To this end the receiver 42 in a section transmits a signal received from the transmitter 40 provided in the helmet 25 to the central control room 26 together with a section identifying signal specific to the relevant section. The position detection device 30 in the central control room 26 can recognize worker by section location. The detected position of workers is displayed on a cathode ray tube 34 of a control panel 32 under the control of a central processing unit 31.

In this manner, by detecting the ultrasonic waves emitted from the helmets 25 carried by the workers 22 by means of the fixed sensors 27, it is possible to identify the positions of the workers 22 in the construction 21.

The ultrasonic wave used in this embodiment has a superior directional property and is not substantially decayed by smoke and flame. In the case of using the ultrasonic wave, it is not necessary to provide means for suppressing various noises in the atmosphere such as electromagnetic waves and light. Further, when use is made of the ultrasonic wave having a frequency higher than 20 KHz, it does not affect human beings at all.

The remaining construction of the system in the present embodiment is entirely the same as that of the previous embodiment illustrated in FIG. 2.

In this embodiment, the transmitter 40 transmits an ultrasonic wave and the communication devices 41 and 43 also transmit ultrasonic waves. Therefore, the ultrasonic wave emitting elements of the transmitter 40 and communication device 41 may be a common single element. In this case, a carrier having a specific frequency may be modulated in accordance with the speech signal to be transmitted from the communication device 41. Then the transmitter 40 may be a simple oscillator for generating the carrier. Further, the communication devices 41 and 43 may be formed by wireless communication devices using electromagnetic waves.

What is claimed is:

1. A system for supervising and guiding persons in a construction divided into a plurality of sections comprising:

identifying means provided in each respective section for receiving radiation emitted from one or more persons located in one or more respective sections, each identifying means producing a signal representing the presence of one or more persons in a respective section, and supplying the signal to a central control room in such a way that the central control room can identify said respective section;

means arranged in the central control room for receiving signals supplied from identifying means in respective sections in which one or more persons are situated;

means provided in the central control room for displaying the detected position of said respective sections in which one or more persons are situated;

means provided in the central control room for sending information to persons in said respective sections in which one or more persons are situated;

means provided in each respective section for detecting an abnormal condition occuring in respective sections and producing a signal, and means provided in the central control room for responding to said detection signal;

means provided in the central control room for generating information adequate for emergency escape on the basis of the detected positions of persons and the positions of sections in which the abnormal condition has been detected, and means for displaying the information together with the detected positions of persons; and means provided in each respective section for displaying said information adequate for emergency escape.

2. A system according to claim 1, wherein said receiving means comprises an element for detecting infrared radiation emitted from a person.

3. A system according to claim 1, wherein said receiving means comprises an element for detecting radiation emitted from a transmitter possessed by a person.

4. A system according to claim 3, wherein said transmitter is conducted to emit infrared radiation.

5. A system according to claim 4, wherein said infrared radiation has a wavelength longer than 800 nm, preferably longer than 5 μm.

6. A system according to claim 3, wherein said transmitter is constructed to emit an electromagnetic wave.

7. A system according to claim 6, wherein said electromagnetic wave has a frequency within a range from 100 MHz to 10 GHz.

8. A system according to claim 3, wherein said transmitter possessed by the person is constructed to emit said radiation which is modulated in accordance with a person identifying signal having a frequency specific to said transmitter, and said central control room further comprises means for detecting the person identifying signal.

9. A system according to claim 3, wherein said transmitter is constructed to emit an ultrasonic wave.

10. A system according to claim 9, wherein said ultrasonic wave has a frequency higher than 20 KHz.

11. A system according to claim 3, wherein said transmitter is installed in a device possessed or worn by a person.

12. A system according to claim 11, wherein said device is a helmet worn by a person.

13. A system according to claim 12, wherein said helmet further comprises a communication device including a microphone and earphone, each section further comprising a transmitter-receiver, and said central control room further comprises a communication device for effecting an intercommunication between the central control room and respective persons.

14. A system according to claim 13, wherein said transmitter is commonly used to transmit said radiation and to transmit a speech signal supplied from the microphone.

15. A system according to claim 14, wherein said communication device provided in the helmet comprises means for modulating a carrier having a given frequency in accordance with the speech signal supplied from the microphone to produce a modulated carrier, and said transmitter comprises an oscillator for generating said carrier and an emitter for generating the radiation whose intensity is modulated in accordance wtih said modulated carrier.

16. A system according to claim 15, wherein said carrier has a frequency specific to said helmet, and said central control room further comprises means for discriminating the frequency of the carrier to identify respective persons.

17. A system according to claim 1, wherein said detecting means comprises a sensor for detecting smoke, flame or an abnormal temperature.

18. A system according to claim 17, wherein each section further comprises means for preventing the fire, and said central control room further comprises means for actuating said fire preventing means in response to said detection signal.

19. A system according to claim 1, wherein said central control system comprises means for indicating the detected abnormal condition in the construction.

20. A system according to claim 19, wherein the central control room further comprises means for displaying the identification of one or more sections in which the abnormal condition has been detected as well as the detected positions of persons in the construction.

* * * * *